United States Patent [19]
Veigel

[11] Patent Number: 6,126,290
[45] Date of Patent: Oct. 3, 2000

[54] WATER DRAINING FIXTURE WITH LIGHT GUIDE ILLUMINATION MEANS

[76] Inventor: Gunter Veigel, Kreuzackerweg 3, D-71229 Leonberg, Germany

[21] Appl. No.: 09/319,713

[22] PCT Filed: Dec. 23, 1997

[86] PCT No.: PCT/DE97/03021

§ 371 Date: Jun. 10, 1999

§ 102(e) Date: Jun. 10, 1999

[87] PCT Pub. No.: WO98/28496

PCT Pub. Date: Jul. 2, 1998

[30] Foreign Application Priority Data

Dec. 24, 1996 [DE] Germany .............................. 196 54 359

[51] Int. Cl.⁷ ..................................................... F21V 33/00
[52] U.S. Cl. ............................ 362/96; 362/109; 362/551; 362/552; 362/583; 239/18; 239/20
[58] Field of Search ...................................... 362/552, 583, 362/562, 577, 581, 96, 109; 239/289, 18–20; 339/602

[56] References Cited

U.S. PATENT DOCUMENTS

| 4,616,298 | 10/1986 | Bolson ..................................... 362/192 |
| 5,207,499 | 5/1993 | Vajda et al. ............................... 362/96 |
| 6,021,960 | 2/2000 | Kehat ...................................... 239/289 |

FOREIGN PATENT DOCUMENTS

| 0337 367 | 10/1989 | European Pat. Off. . |
| 0 446 365 | 9/1991 | European Pat. Off. . |
| 1 609 211 | 9/1971 | Germany . |
| 31 35 861 | 3/1983 | Germany . |
| 83 14 970 | 3/1985 | Germany . |
| WO 95 29300A | 11/1995 | WIPO . |

*Primary Examiner*—Sandra O'Shea
*Assistant Examiner*—Ismael Negron
*Attorney, Agent, or Firm*—Paul Vincent

[57] ABSTRACT

A water draining fixture (1) for plumbing applications with which light is introduced into a water jet (6) emanating from an outlet opening (5) of a fixture head (3), with a water conduit (4) guiding the water to the outlet opening (5), and with a light guide (8) guiding the light separate from the water conduit (4) from a light source located outside of the water draining fixture (1) up to exit out of at least one light outlet opening (19), wherein a plurality of water outlet openings (5) surround the at least one centrally disposed light outlet opening (19) in a ring-shaped fashion and are connected to the water conduit (4) at an annular space (7) surrounding the light guide (8) in the vicinity of the fixture head (3). The centered exiting light is shielded towards the outside by the ring-shaped surrounding water jets to at least minimize glare.

13 Claims, 3 Drawing Sheets

WATER DRAINING FIXTURE WITH LIGHT GUIDE ILLUMINATION MEANS

BACKGROUND OF THE INVENTION

The invention concerns a water draining fixture for plumbing applications with which light is fed into a water jet emanating from an outlet opening of a fitting head, with a water conduit guiding the water to the outlet opening and with a light guide which guides the light, separated from the water conduit, from a light source located outside of the water draining fixture up to the outlet and out of at least one light outlet opening.

A water draining fixture of this kind is e.g. known in the art through DE 31 35 861 C2.

In the following, the designation "light" refers both to visible light as well as to infra-red light (IR) and ultra-violet light (UV).

WO 95/29300 describes a water draining fixture with which light is fed into water jets exiting from outlet openings. Towards this end, light in the fixture head is fed via a transparent window into the water flowing through the fixture head so that light can also exit out of the outlet opening for the water. However, the major portion of the light fed into the water can not exit via the outlet openings. This substantially reduces the intensity of the exiting light. In addition, the amount of light fed is reduced by calcium deposits on the transparent window to thereby cause a reduction in the intensity of the exiting light. Special windows are required for feeding-in IR or UV light. Since an interrupted water jet can not guide light, the water jet of the conventional drain fixture can only be brightened by the light guided within it until it is interrupted by the formation of drops. Towards this end, additional light sources are provided for on the fixture head which surround the exiting water jet in a ring-shaped fashion to increase luminosity of continuous water jets. This leads to annoying glare effects.

In the conventional water draining fixture known from DE 31 35 861 C2, light exiting out of optical fibers, a plurality of which are disposed in a ring-shaped fashion about the periphery of the water outlet opening, is fed into a water jet exiting from a central water outlet opening of a fixture head. Since the light in the fixture head is not guided through the water rather through the optical fibers, and is first input after the water exits, the light intensity is not reduced and only minimal calcification problems can occur. The light exits via the individual light guides substantially parallel to the water jet so that the water jet is surrounded in a ring-shaped fashion by individual light beams. Since it is not shielded, the exiting light can lead to the observation of glare by the user. The light does not therefore serve for illuminating the exiting water jet, rather for illuminating the space below the water draining fixture. For this reason, the water jet, surrounded by the light, is rather dark.

In contrast thereto, it is the underlying purpose of the present invention to further improve a water draining fixture of the above mentioned kind in such a fashion that light can be introduced into an exiting water jet with high intensity and with as little glare as possible.

SUMMARY OF THE INVENTION

This purpose is achieved in accordance with the invention in that a plurality of water outlet openings surround at least one centrally disposed light outlet opening in a ring-shaped fashion (at the outside) and are connected to the water conduit via an annular space surrounding the light guide (at the outer side thereof) in the vicinity of the fixture head.

The water draining fixture in accordance with the invention therefore has the substantial advantage that centrally exiting light is shielded towards the outside by the water jets surrounding the light in a ring-shaped fashion to at least reduce glare effects. The central light outlet facilitates feeding out the light via suitable outlet optics into non-interrupted as well interrupted water jets, towards which end e.g. a light distributor such as a reflector can deflect the light into appropriate directions. The light outlet opening can be covered by a transparent scattering or protective plate which can be removed for purposes of cleaning, which can have openings for pulsed or massage water jets, and which can also serve for supporting a reflector, possibly also having at least one opening for pulsed or massage water jets. Optical components, e.g. such as a reflector, can be partially mirrored.

In a particularly preferred embodiment, the light in the light guide can be introduced via optics, in particular deflection optics, into one end of a light distributor disposed in the fixture head, in particular in a central fashion, from the other end of which the light exits in the direction towards the light outlet opening. This light distributor can e.g. be a reflector or a light guide which appropriately distributes the input light over its light outlet surface, in particular in a ring- or facet-shaped manner, and which e.g. can be plugged into a cylindrical shaped opening in the fixture head. Calcium deposits can be easily removed from a removable light distributor. The light can be guided up to the fixture head via e.g. a light guide or a light guide cable and then deflected by means of a suitable optics (mirror, input-/output-coupling lens, light guide etc.) and introduced into the light distributor, in particular in a widened, narrowed or parallel fashion.

An advantageous improvement of this embodiment provides that the light distributor is mounted within an opening in the fixture head. For example, a light distributor configured as a light guide rod can be screwed via an outer thread into a threaded opening, usually present with hand-held shower-heads, in the vicinity of a reflector. Towards this end, a ring-shaped bushing surrounding and securing the light guide rod can be provided for which is mounted to the fixture head via a nut. This threaded opening can also be used to screw in a protective plate and a water screen. All other types of connections (plug connections, bayonet connections) are also possible.

In an additional preferred improvement, the light distributor has a reflector at its outlet side for reflecting the light towards the light outlet opening in order to minimize intensity losses for the exiting light. The light distributor reflector can comprise a mirror, a prism, a light guide or an opening through which the water can flow as a result of which rotating components, e.g. for producing pulsing water jets, can be driven.

In an additional advantageous embodiment, a chopper plate is provided in the fixture head for interrupting the optical path of the light and is preferentially driven by the exiting water. The above mentioned rotating components can drive this chopper plate with a rate of revolution corresponding to the outlet flow velocity of the exiting water jet which can lead to a "chopper-like" water-/light effect.

A further preferred embodiment is characterized in that one or a plurality of color-selective plates can be introduced into the optical path of the light and/or luminosity collimators can be provided for in the fixture head. The collimators and the colored plates can be rotated and adjusted by hand and serve for luminosity adjustment or to produce individual colors from white light, wherein their adjustment can be effected by hand on the fixture head via suitable adjustment rings and gears. The collimators or the colored plates preferentially engage into a gap in the light guide.

In another embodiment, a switch is provided for in the water conduit which can switch the light and which can be operated by the flowing water, e.g. a valve flap, so that the exiting light can be switched on and off in dependence on the water flow in an automatic and synchronous fashion.

In a highly preferred embodiment which, in accordance with the invention, can also be used independent of a special water-draining fitting, at least one dispersion body is provided in the optical path of the light in or at the fixture head which decomposes the light into its spectral colors. If e.g. a prism is used, a rainbow can be fed into the exiting water jets. Should a color plate be disposed in the optical path downstream of the prism, an individual color can be extracted from the light. The prism can be disposed upstream or downstream of the light outlet opening of the fixture head in a central or decentralized fashion and can be disposed for alignment, displacement, for pivoting, or rotation. A plurality of prisms can be provided for in different individual geometries.

In a particularly preferred improvement of this embodiment, the at least one dispersion body is ring shaped, wherein differing geometries (closed or partially opened, toroidal or semi-circular rings) are possible. A prism ring can be used to amplify the rainbow effect compared to a single prism. For example, with two oppositely positioned prism ring segments, two similar rainbows can be created in left and right portions of the exiting light beams. A central water jet can also flow through the inner opening of the prism ring.

Another improvement is distinguished in that the light can be fed into the at least one dispersive body via a light distributor such as e.g. a reflector or light guide having an exit side adapted to the at least one dispersive body. For example, the light guide can have a slanted surface at the light outlet side in order to introduce light into the prism at a certain angle.

In a preferred embodiment, at least one light beam is provided for on the fixture head or on a wall, which is directed towards an exiting water jet in opposition to its output direction. A rainbow can be observed at a certain observation angle with respect to the exiting water. For example, this light beam can be generated by a light source integrated into the wall of the shower. In order to amplify the optical effects, additional prisms and a transparent plate or a type of mist shower can also be provided for.

In a highly preferred embodiment, a combined light-water hose is connected to the draining fixture via coupling members and the light guide comprises a light guide pipe or individual light guide legs or optical fibres which jacket and surround the water conduit. The light pipe surrounding the water conduit or the individual light guide legs or the optical fibres surrounding the water conduit are collected together into a common light guide or common light guide bundle at the connecting side of the light guide facing the fixture head. This leads to separate light and water connections (screw connections) and therefore to a simplified hose-fixture transition. The transport of the light in the fixture is preferentially effected via a light guide. The collected light guides or light guide bundles can be introduced deeply into the fixture head, e.g. up to deflection or up to the light outlet opening so that there is no need for mounting the light connectors to the fixture head. The light guides or the light guide bundles can be fixed in position and mounted in a water-tight fashion via bushing connections located in the fixture head. Light, guided in the light guide or light guide bundle can be deflected towards the light outlet opening via appropriate optics.

BRIEF DESCRIPTION OF THE DRAWING

Additional advantages of the invention can be derived from the description and the drawing. The above mentioned features and those to be further described below can be utilized in accordance with the invention individually or collectively in arbitrary combination. The embodiments shown and described are not to be considered as exhaustive enumeration, rather have exemplary character only for illustration of the invention.

DESCRIPTION OF THE PREFERRED EMBODIMENT

Figure 1:
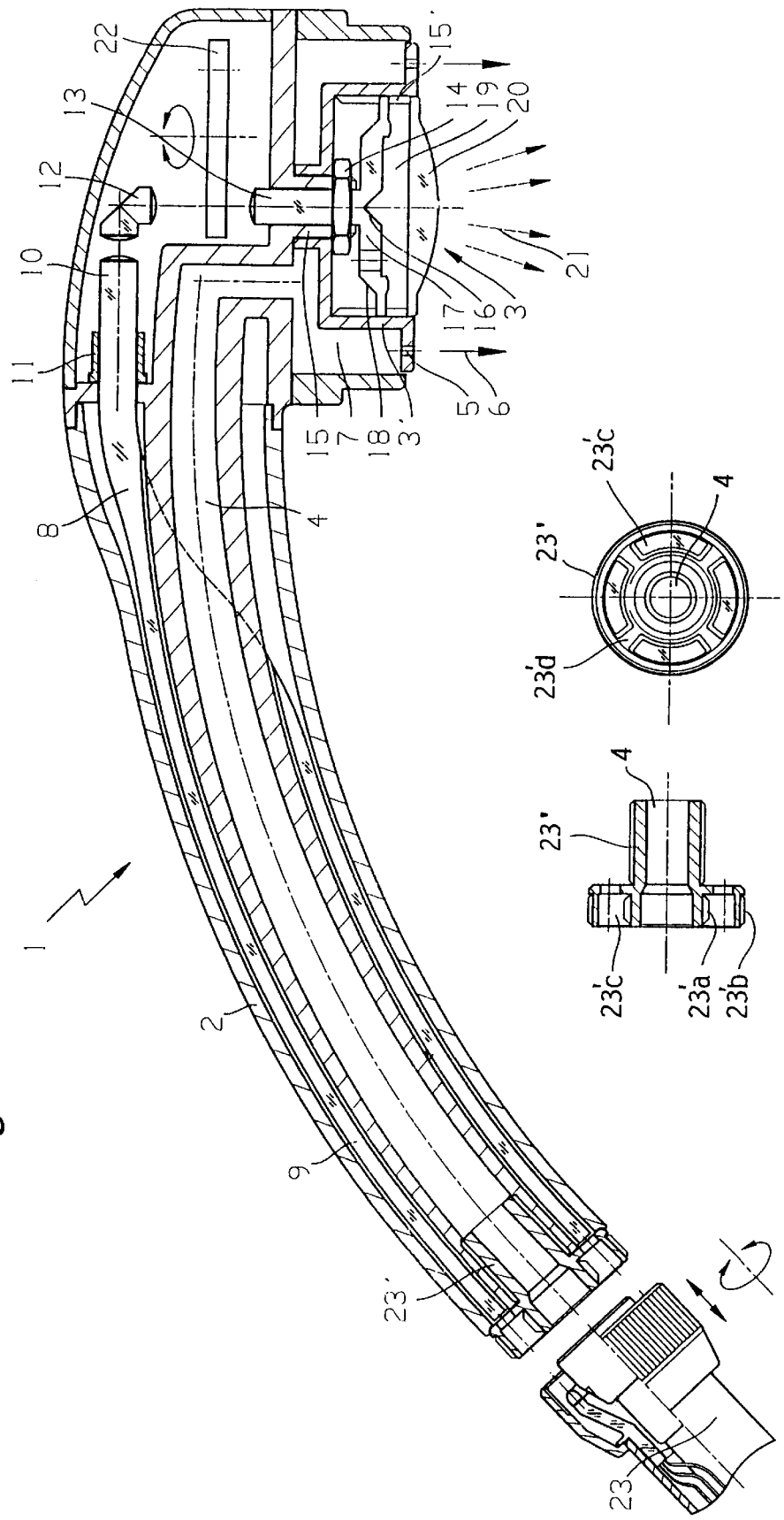
FIG. 1a shows a water-draining fixture in accordance with the invention configured as a hand-held shower head having a first light guide variation, partially represented in longitudinal section.
FIG. 1b is a detailed view of a coupling member of the water-draining fixture of FIG. 1.
FIG. 1c is an end view of the coupling member of FIG. 1b.

FIG. 1a shows a water draining fixture 1 having a hollow housing 2 and a fixture head 3. The water draining fixture 1 guides a water conduit 4 from which water jets 6 can exit via water outlet openings 5 disposed on the fixture head 3. These water outlet openings 5 are disposed in a ring-shaped fashion on the fixture head 3 and are connected to the water conduit 4 via an annular space 7.

A light guide 8 also travels in the water draining fixture 1, whose light guide fibers, light pipes, or optical fibres 9 surround the water conduit 4 and are joined together into a common light guide or light guide bundle, separate from the water conduit 4, at the side facing the fixture head. This light guide or light guide bundle 10 ends at the fixture head 3 and is fixed in position in a water-tight fashion by means of a bushing 11.

The light guided in the light guide 8 and exiting via the light guide or the light guide bundle 10 is coupled into a light distributor 13 by means of a deflection optics 12 (input or output coupling lenses, mirrors, light guides . . . ). In the embodiment, this light distributor 13 is a rod-shaped light guide having an outer thread 15'. The light distributor 13 is plugged through an outwardly threaded bushing 15 of the fixture head 3 and is screwed into a ring-shaped bushing 3' in the fixture head 3, in a water-tight fashion via an outer thread, wherein a nut 14 supports the ring-shaped bushing. The light guided in the light distributor 13 is deflected by means of an inner reflecting wall 16 into a radial section 17 of the light distributor 13 and, via outer reflecting walls 18 in the direction towards the light outlet opening 19 and exits out of same over a wide area in a ring-shaped fashion. The light outlet opening 19 is additionally sealed in a water-tight fashion by means of a transparent protective/scattering plate 20. A removable lid (not shown), is provided on the housing 2 in the vicinity of the fixture head 3 for cleaning and maintenance purposes.

The light 21 exiting out of the fixture head 3 which is surrounded in a ring-shaped fashion by the water jets 6 enters into these water jets 6 and is guided thereby as result of which the water jets 6 are illuminated. An individual color can be extracted from the white light or the brightness of the light can be adjusted from the outside using a color filter or a collimator 22 borne for rotation in the fixture head 3 and engaging into the optical path of the light.

The water draining fixture 1 is connected to a combined light-water guiding hose 23 via a coupling member 23', wherein a coupling member 23' guarantees a proper water-light transition between the hose 23 and the water draining fixture 1.

Reflectors for better light-guiding, a chopper plate driven by water flowing through the fixture head 3 and interrupting the optical path of the light, as well as a switch for switching the light and operated by the flowing water, can be provided for in the fixture head 3.

The light introduced to the water draining fixture 3 via the hose 23 can come from a light plug (not shown) provided for in a wall or from a color fixture (not shown). Such a color fixture has a light outlet and a color-selective filter engaging into the optical path of the light whose color selection can be adjusted from the outside. The color filter can be used to extract a desired individual color from white light, e.g. coming from the light plug. The color adjustment is preferentially effected manually or by means of a knob connected to the color filter. A tilting of this knob also facilitates adjustment of the brightness via a collimator disposed in the optical path upstream or downstream of the color filter.

The coupling member 23' is shown in FIGS. 1b and 1c. A water conduit in the hose 23 is screwed into a thread 23'a and a light guide surrounding this water conduit is screwed into a thread 23'b in the coupling member 23'. The thread 23'b is connected via braces 23'd to the thread 23'a so that the light guided in the light guide of the hose 23 can gain entrance e.g. into the light guide fibers 9 via the ring segment-shaped input openings 23'c. This special threading technology, having two screwable threads, facilitates a compact connection.

Figure 2:
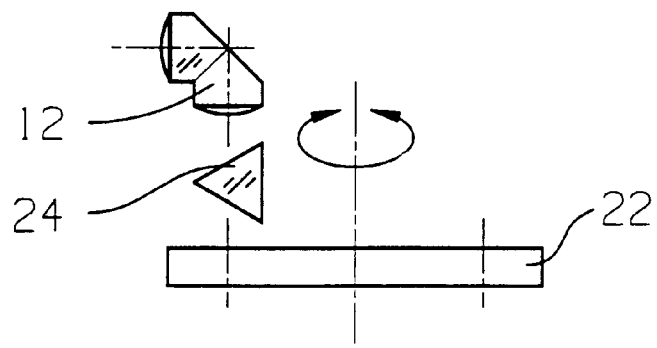
FIG. 2 is a second light guide variation having a dispersive prism.
Figure 3:
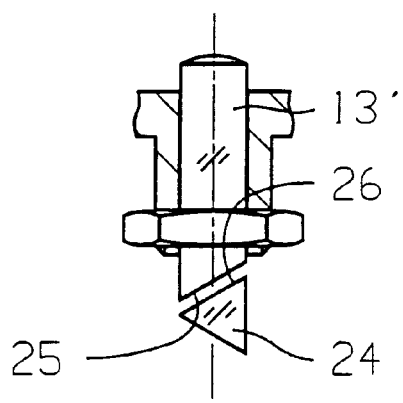
FIG. 3 is a third light guide variation having a dispersive prism.
Figure 4:
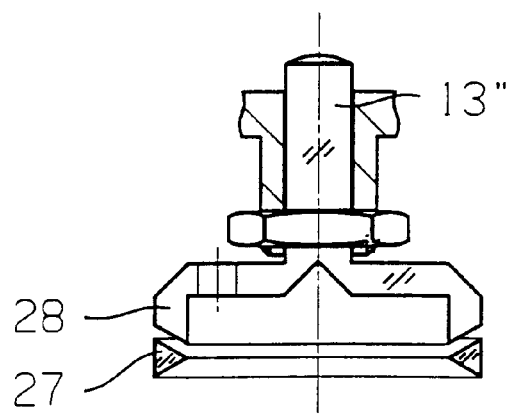
FIG. 4 is a fourth light guide variation having a prism ring.

FIGS. 2 through 4 show possible modifications to the optical path of the water draining fixture 1 as shown in FIG. 1a. In FIG. 2, a color filter 22 in the form of a dispersive prism is provided between the deflection optics 12 and the rotatable color filter 22 to split white light into its spectral colors. A desired individual color can be coupled-out via this downstream color filter 22 so that colored light exits from the water draining fixture 1 and illuminates the water jets 6 in a colored manner.

In FIG. 3, the dispersive body 24, likewise configured as a prism, is disposed downstream of the light distributor 13', wherein, the light outlet side 25 of the light distributor 13' is matched to the light input side of the prism in order to effect an optimal coupling-in of the light. Rainbow colors can be produced in the exiting water jets 6 or a rainbow in the water jets 6 using these dispersive bodies 24 disposed in the optical path of the light.

In order to amplify this rainbow effect, the dispersive body 27 of FIG. 4, into which the light guided in the light distributor 13" is introduced via a ring-shaped section 28, is configured in a ring-shaped fashion.

In order to produce a rainbow, a light beam (not shown) can also be provided for at the fixture head 3 or on a wall facing in a direction opposite to the exit direction of the exiting water jets 6. A rainbow can then be observed at a certain observation angle relative to the exiting water jets 6. This light beam can e.g. be irradiated from a light source integrated into a shower wall.

Figure 5:
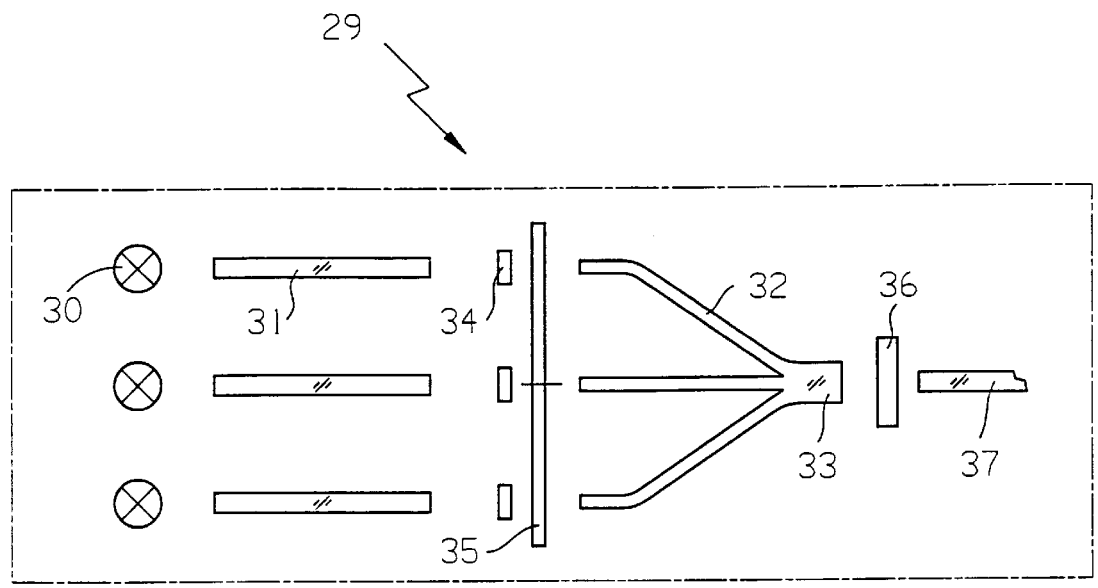
FIG. 5 is a schematic view of a color mixing faucet.

FIG. 5 schematically shows a color mixing faucet 29 with which light of arbitrary color can be produced and e.g. fed in the above mentioned water draining fixture 1. Three differing colored light sources 30 are provided for in the color mixing faucet 29, the light of each of which is separately guided via light guides 31 and subsequently via light guide arms 32 and joined in a common light guide section 33. Each optical path of the light has a luminosity collimator 34 as well as a common aperture collimator 35 between the individual light guides 31 and the light guide arms 32. The luminosity collimators 34 facilitate adjustment of the intensities of the light coming from each individual light source. The aperture collimator 35 can be rotated into eight positions in which either only the light coming from one particular source 30, from two sources 30, or from all three sources 30 passes. The summed color of the passed individual colors thereby results in the common light guide section 33. The luminosity collimator 36 can be used to adjust the light intensity of the summed color before the light exits out of the color mixing faucet 29 via the light guide 37.

Figure 6:
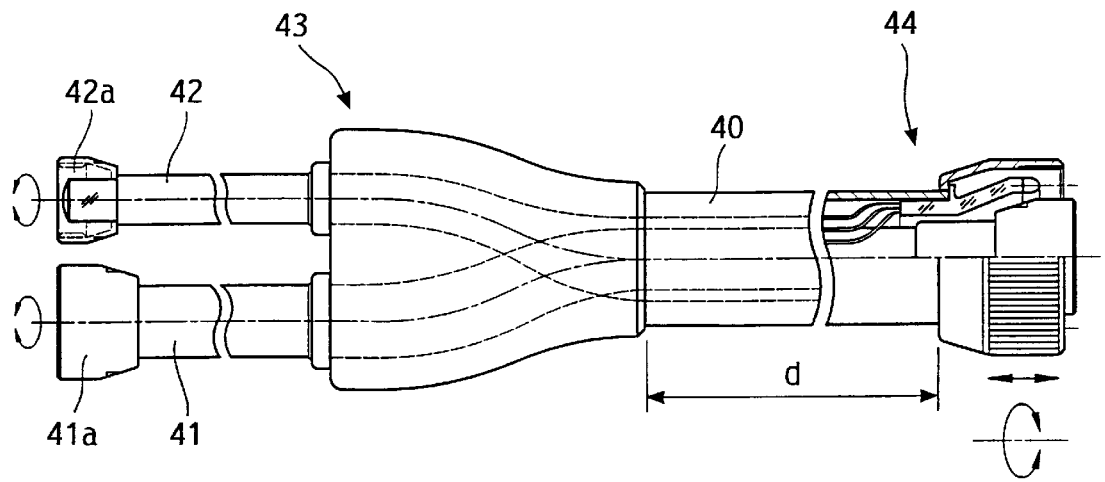
FIG. 6 is a combined light-water hose having separate adaptors for light and water.

FIG. 6 shows a separate view of a combined light/water hose 40 the water conduit 41 and light guide 42 of which can be connected at the input side to a water conduit and a light source (light plug, color fixture, color mixture faucet) and attached via screwable sleeves 41a, 42a. The light guide 42 is passed via the adaptor 43 into a light guide surrounding the water conduit 41 at a section d. The light guide 42 preferentially comprises individual optical fibers at this section d as a result of which the hose 40 is flexible or can be bent. Connection to the water draining fixture 1 can be effected by means of a coupling element 44 which can be screwed on at the output side, e.g. with the assistance of the coupling member 23' shown in FIGS. 1b and 1c. The particular advantage is that two media namely water and light can be guided together in a hose 40 and separated again at the ends via similar or differing transition or coupling elements.

I claim:

1. A water draining fixture for plumbing applications comprising:

a water draining fixture handle having a conduit to transport water through said handle;

a light guide disposed in said handle and separated from said conduit to transport water through said handle;

and a fixture head in liquid communication with said conduit and in optical communication with said light guide, said fixture head having a central light outlet opening for passing light from said light guide out of said fixture head, said fixture head having a plurality of water outlet openings surrounding said light outlet opening in a ring-shaped manner to produce a plurality of water jets exiting out of said water outlet openings, said fixture head also having an annular space disposed between and communicating with said water outlet openings and said conduit to conduct water from said conduit to said water outlet openings, whereby said water jets surround light exiting through said light outlet opening out of said fixture head.

2. The fixture of claim 1, further comprising means disposed in said water conduit for switching light, said light switching means activated by flowing water.

3. The fixture of claim 1, further comprising a light-water hose and a coupling member for coupling said hose to said fixture handle, wherein said light guide comprises at least one of light pipes, individual light guide legs, and optical fibres which surround said water conduit, wherein said at least one of light pipes, individual light guide legs, and optical fibres join together into one of a common light guide and a light guide bundle at an output end of said light guide proximate said fixture head.

4. The fixture of claim 1, further comprising a plate member disposed in the fixture head for interrupting an optical path of the light.

5. The fixture of claim 4, wherein said plate member comprises a chopper plate.

6. The fixture of claim 4, wherein said plate member comprises at least one of color-selective plates and luminosity collimators.

7. The fixture of claim 1, further comprising a light distributor disposed in said fixture head to pass light from said light guide towards said light outlet opening.

8. The fixture of claim 7, wherein said fixture head has an opening within which said light distributor is mounted.

9. The fixture of claim 7, wherein said light distributor reflects light towards said light outlet opening.

10. The fixture of claim 7, further comprising a dispersive body disposed within said fixture head in an optical path of light proximate said light outlet opening.

11. The fixture of claim 10, wherein said dispersive body is ring-shaped.

12. The fixture of claim 10, wherein said dispersive body is disposed downstream of said light distributor, said light distributor having an output side matched to said dispersive body.

13. The fixture of claim 10, further comprising means for directing a light beam opposite to an outlet direction of said water jets.

* * * * *